L. T. BARNES.
WATER METER OR METER SYSTEM.
APPLICATION FILED JULY 16, 1914. RENEWED MAR. 30, 1917.

1,232,180.

Patented July 3, 1917.
2 SHEETS—SHEET 1.

Witnesses:

Inventor
Llewellyn T. Barnes
By his Attorneys

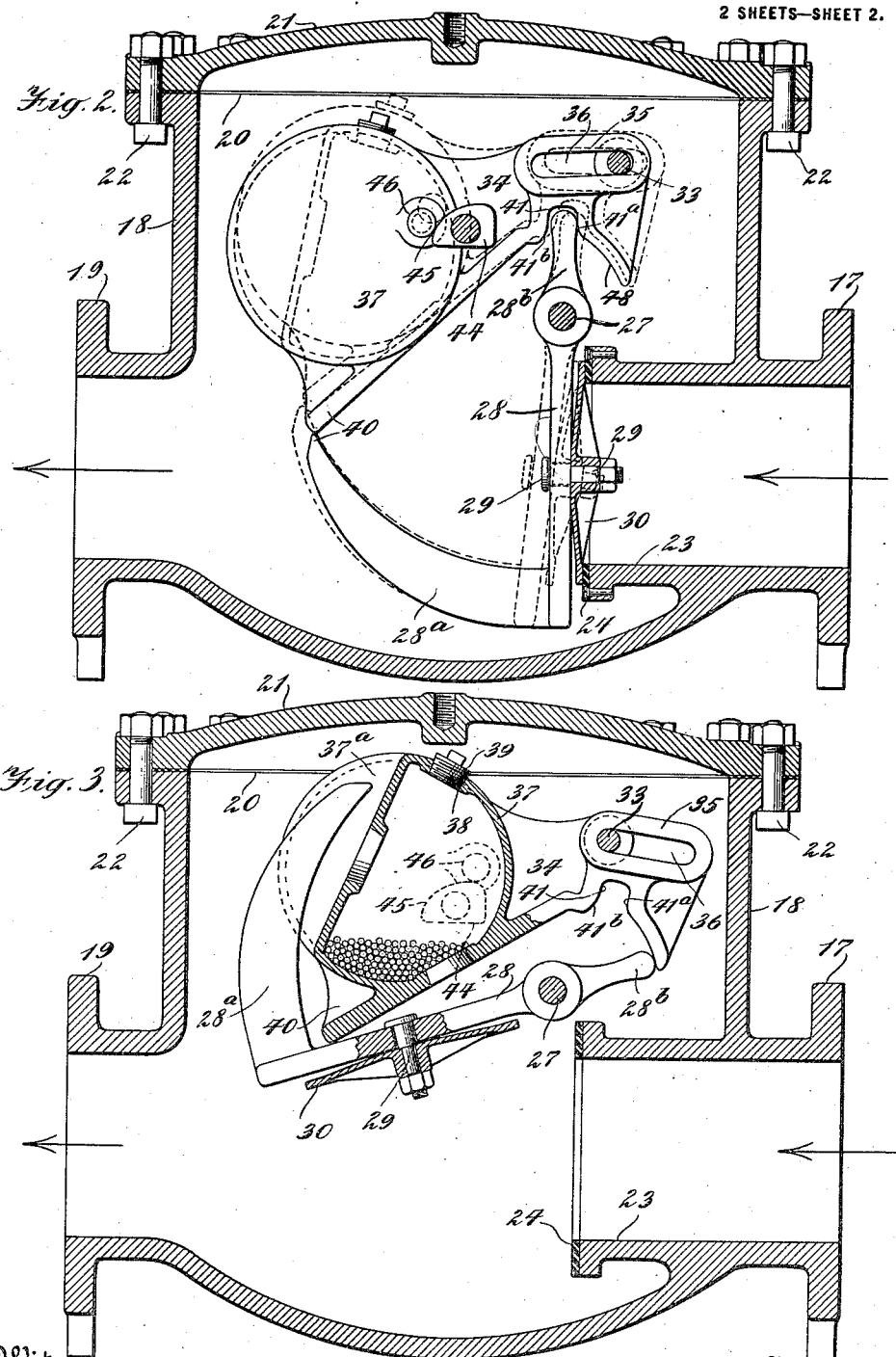

UNITED STATES PATENT OFFICE.

LLEWELLYN T. BARNES, OF SEA CLIFF, NEW YORK, ASSIGNOR TO NATIONAL METER COMPANY, OF NEW YORK, N. Y., A CORPORATION OF NEW YORK.

WATER-METER OR METER SYSTEM.

1,232,180.            Specification of Letters Patent.          Patented July 3, 1917.

Application filed July 16, 1914, Serial No. 851,240. Renewed March 30, 1917. Serial No. 158,734.

*To all whom it may concern:*

Be it known that I, LLEWELLYN T. BARNES, a citizen of the United States, residing at Sea Cliff, Long Island, in the county of Nassau and State of New York, have invented certain new and useful Improvements in Water-Meters or Meter Systems, of which the following is a specification.

My invention relates broadly and generally to new and useful improvements in water meters or meter systems of that character or type including two meters, one of a capacity for measuring comparatively low or normal rates of flow and the other for measuring comparatively high rates of flow beyond the capacity of the meter for measuring the normal rates, means being provided for automatically throwing the meter of high capacity into operation when the flow exceeds the capacity of the meter measuring the normal flow.

The object of the present invention is to provide an automatically acting valve which will be automatically opened when conditions require the service of the meter of high capacity, which will continue in open position as long as this requirement exists, and automatically close, and be held closed, when the rate of flow drops, so as to be within the capacity of the meter for measuring normal flows.

The invention consists in the novel construction and combination of parts to be more fully described hereinafter and the novelty of which will be particularly pointed out and distinctly claimed.

I have fully and clearly illustrated my invention in the accompanying drawings, to be taken as a part of this specification, and wherein:

Fig. 2 is a vertical central longitudinal section through the valve-casing showing my improved valve in closed position.

Fig. 3 is a view in vertical central longitudinal section through the valve-casing showing the valve in open position to permit flow through the meter of high capacity.

Figure 1:
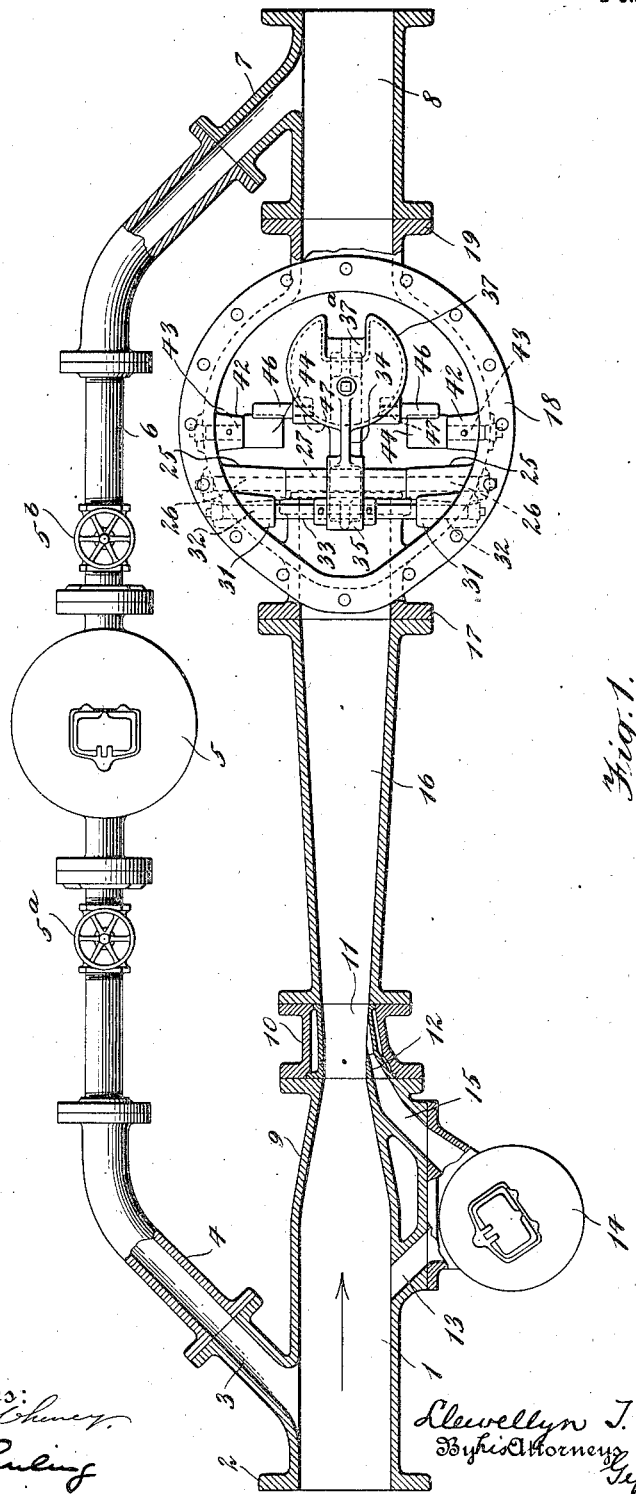
Figure 1 is a plan view, partly in section, of a meter system including my invention.

Referring to the drawings by characters of reference:

1 designates a pipe connection, one end 2 of which is adapted to be connected to a main or other source of flow (not shown), said connection having a branch coupling 3 connected to one end of a pipe 4 leading to a meter 5, which may be of a capacity of measuring comparatively low or normal rates of flow. The outlet side of said meter 5 is connected by an outlet pipe 6 with a branch 7 of a pipe connection 8 which is adapted to be connected to the outlet of the system. Flow through this meter 5 may be controlled by valves $5^a$, $5^b$, arranged respectively in the pipes 4 and 6, on opposite sides of the said meter. The inner end of the pipe connection 2 is tapered or reduced to a cone shape, as at 9, and is connected by a suitable water-tight connection to the casing 10, the latter containing a proportional flow device in the form of a sleeve or tube 11, and having a by-pass or branch duct 12 having a capacity of flow in determined proportion to the capacity of flow through the said device 11.

The pipe connection 1 is provided with an outlet branch connection 13 which is connected to the inlet side of a proportional meter 14, the outlet side of which is connected to a branch 15 of the connection 1 and communicates through said branch 15 with said by-pass or duct 12. The duct 12 may be proportioned so as to have a definite rate of flow relative to the rate of flow through the main bore of the device 11 and the indicating mechanism of the meter 14 is so geared as to indicate the correct flow through said main bore.

The opposite end of the casing 10 from that connected to the outlet end of the pipe 1, is connected to a pipe or conduit 16 which gradually expands or flares from its point of connection with said casing 10, the larger end of said pipe 16 being connected to the inlet end 17 of a valve-casing 18, the outlet 19 of which is connected to the pipe connection 8, heretofore described. It will be understood that the pipe connections 1, the proportional flow device 11, the pipe 16, valve-casing 18, and connection 8 are of diameters or design permitting rates of flow in excess of the capacity of the pipe 4, heretofore described. It will also be understood that the meter 14 is of a design capable of measuring rates of flow too high to be within the measuring capacity of the meter 5.

The design of the valve-casing 18 may be any which will suit it to the purposes intended, the body of the same preferably having its top portion formed with an opening, as at 20, closed by a suitable cover plate 21 held in position by fastening bolts 22. The opening to the inlet 17 is preferably provided with a neck 23 the inner end of which forms a valve seat, said seat being faced by suitable packing material 24, the face of the seat being preferably in a vertical plane.

Projecting inward toward each other from opposite sides of the casing are hollow bosses 25, 25, in which are mounted the ends 26 of a horizontally disposed pivot pin or shaft 27 upon which pin or shaft is suspended a supporting member 28 carrying a stud or pin 29 upon which is supported a valve disk or plate 30, the rim of which is adapted to coöperate with the seat 24 to control flow of water through the casing from said inlet 17. It will be seen that the said valve is freely movable toward and away from said seat, so that a predominating pressure on the inlet side of the casing over that on the outlet side will tend to open the valve, while an excess of pressure at the outlet over the inlet tends to close the valve.

The lower end of the member 28 preferably extends below the lower edge of the neck 23, and connected to said lower end is a holding arm or toe 28ª, the said arm curving upward from its point of connection with the member 28, the free end thereof terminating preferably at a point approximating the center of the valve 30, as clearly shown in Fig. 2, said arm serving a purpose to be presently described. Rigid with the member 28 and projecting above the pivot thereof is an operating member 28ᵇ which may be, as shown, in substantially longitudinal alinement with the member 28, said operating member 28ᵇ being preferably rounded at its upper end, as shown in Figs. 2 and 3, and arranged to swing with the said supporting member 28 for a purpose to be presently set forth.

Means is provided for holding the valve closed under ordinary flows, but operating to release the valve to permit it to open when the pressure at the inlet exceeds in a determined relation that of the outlet, due either to a reduction of pressure at the outlet or an increase of pressure at the inlet. This means will now be described:

Above the shaft 27, and slightly in advance thereof, toward the inlet, are two alining hollow bosses 31 projecting inward toward each other from opposite sides of the inner face of the casing, in which bosses are respectively mounted the opposite ends 32, 32, of a horizontally disposed pivot pin or shaft 33.

Supported on the shaft 33 is a gravity member which is adapted preferably to be movable relative to the valve so as to exert its force thereon during normal flows, to maintain the valve closed, but operable when the valve opens to be moved out of holding relation to the valve and be held out of holding relation thereto during flows beyond the capacity of the normal or low capacity meter. This gravity member preferably consists of a swinging element 34 having at one end an arm 35 provided with a longitudinal slot 36 receiving the said shaft 33, the arrangement being such that the member 34 may swing on the pin 33 and may also have movement thereon in a straight line lengthwise of said slot 36. At the end opposite to the arm 35 the member 34 supports a weight which is preferably in the form of a receptacle 37 adapted to receive a quantity of shot or similar material sufficient to make the gravity member of the desired weight and have proper holding action on the valve. The receptacle may be provided with a suitable opening 38 adapted to be closed by a suitable removable plug or closure 39, whereby access is had to the interior of the receptacle. I desire it understood that I do not limit myself to the particular form of weight or the manner of adjusting the same, as other forms of weights may be used within the intended scope of my invention.

The member 34 is provided at its free end with a projection 40, which is adapted to coöperate with and rest upon the free end of the holding arm or projection 28ª in order to hold the valve closed, as clearly shown in Fig. 2 of the drawings, so that the valve 30 is held shut against all differences of pressure between the inlet and outlet which are less than the force exerted upon the valve by the gravity member in holding the same closed.

I will now describe the means whereby an excess of pressure on the inlet side of the valve over that on the outlet side sufficient to open the valve against the force of the gravity member serves to move the gravity member out of holding relation to the valve and into a position permitting free movement of the valve relative to its seat as long as the pressure at the inlet remains high enough to prevent the valve closing. Upon the lower side of the arm 33 is provided a recess 41 which receives the rounded end of the operating member 28ᵇ, heretofore described, said recess being wide enough, in a direction transversely of the operating member 28ᵇ, to provide for a certain amount of play or lost motion between said operating member and its point of engagement with the walls of the recess, for a purpose to be presently described, the opposite sides of the recess having engaging faces 41ª, 41ᵇ, to be engaged by the operating member. The arrangement is such that, when the valve is opened by an excess of pressure at the inlet, the arm 28ª primarily acts on the projection 40 to lift the gravity member, and the continued opening movement of the valve throws the member 28ᵇ into engagement with the face 41ᵇ thereby serving to slide the gravity member in a general horizontal direction toward the inlet, and out of the path of movement of the valve, by virtue of the slotted connection between the gravity member and the shaft 33.

Projecting from the inner opposite side walls of the casing 18 are two hollow alining bosses 42, each of which receives a stem 43 on a supporting member 44, said supporting members alining with each other, as clearly shown in Fig. 1 of the drawings. These supporting members are provided on their faces away from the inlet with curved cam faces 45 adapted to be engaged by rollers 46 supported on pins 47 projecting laterally and in opposite directions from the gravity member 34. The arrangement of the cam supports and the rollers 46 is such that, when the gravity member is lifted by the valve and moved on the shaft 33 lengthwise of the slot 36, said rollers ride up said cam faces 45 so that the gravity member takes substantially the position shown in dotted lines in Fig. 3, in which position said rollers are located upon the upper surfaces of the supporting members, respectively, and serve to support the gravity member in a position where it is ineffective to act on the valve to tend to close the same, or to hold it closed, and the valve is free to swing back and forth relative to its seat as long as the pressure at the inlet is sufficiently high to prevent closing the valve. In order to permit the free movement of the valve described, the rear end of the arm 35 is provided with a curved face 48 so that, during the swinging movements of the valve, the operating member 28ᵇ does not in any way affect the position of the gravity member except under conditions and relative position of the parts to be presently set forth.

In order to make a compact structure and for efficiency in design, I provide the receptacle 37 with a recess 37ª adapted to receive the holding arm 28ª when the valve is in open position, so that, when the valve is open, the said arm passes up into said recess.

The arm 28ª is employed because of being of advantage in applying the force of the gravity member with the greatest amount of leverage at the lower edge of the valve so that a small gravity member will be efficient to hold the valve closed. The arrangement is also desirable because it permits relative arrangement of the valve and gravity member necessary to secure desirable smooth working of the parts.

The parts being as above described, and the valve being in the position shown in full lines in Fig. 2, the operation of the system and said valve is as follows:

As long as the rate of flow is low enough to be within the capacity of the meter 5, the flow takes place through the pipes 3, 4, said meter 5, the pipe 6, and the branch 7, to the connection 8, and the valve 30 is held in closed position because the action of the gravity member 34 is sufficient to hold the valve closed against the inlet pressure. Under these conditions, the parts of the valve will be in the positions shown in Fig. 2 with the projection 40 resting upon the free end of the arm or projection 28ª so that the gravity member exerts its force to hold the valve closed. Should, for any reason, the pressure on the inlet side of said valve 30 exceed that on the outlet side of said valve sufficiently to overcome the weight of the valve and the gravity member, the valve 30 will first be moved toward open position and, upon opening, will lift the gravity member, the latter swinging on its pivot 33. When the valve has moved a sufficient distance to take up any lost motion which may exist by virtue of the space between one side of the operating member 28ᵇ and the rear side wall 41ª of the recess 41, the continued opening of the valve will serve to move the gravity member rearward on its pivot by virtue of the slot 36, which will carry the free end of the projection 40 out of holding relation to the free end of the projection 28ª and will carry the rollers 46 into engagement with the cam inclines on the supports 44. The continued opening movement of the valve serves, by means of the engagement between the operating member 28ᵇ and the face 41ª to move the gravity member rearward, thereby causing said rollers to ride up said inclined cam faces and onto the tops of the supports, so that the gravity member is supported out of holding relation to the valve. When the gravity member is supported on the supports, the parts will be substantially in the position shown in Fig. 3 in which the rounded end of the arm 28ᵇ is released from the recess 41 and the valve is free to move back and forth on its pivot without moving the gravity member, unless the pressure at the inlet should drop so low as to permit the valve to gravitate almost to closed position. It will be understood that the gravity member assumes the position shown in Fig. 3 and is held in this position as long as the pressure on the inlet is high enough to open the valve. Should the pressure at the inlet drop low enough to permit the valve to gravitate to closed position, the head of the operating member 28ᵇ will swing with the valve until it strikes the face 41ᵇ of the recess 41 and the continued closing movement of the valve will serve to swing the gravity member forward so that the rollers ride off of the support and permit the gravity member to gravitate into position so that the projection again rests on the end of the arm 28ª to hold the valve closed. The lost motion between the end of the operating member 28ª and the side walls of the recess is necessary in the embodiment shown and described in order to have the end of the projection 40 clear the end of the member 28ª when the valve returns to closed position.

It will be understood that, when the valve is open, the flow then takes place through the meter 14 and the meter 5 simultaneously, and that the combined readings of these two meters will give the correct rate of flow for the entire system.

The invention is not limited to any particular use, but is especially advantageous in situations where there is normally a comparatively low rate of flow which would not be sufficient to meet demands for a comparatively large rate of flow in case of emergency; as, for instance, when there is a large rate of flow demanded in case of fire. Under such conditions, a pump or pumping apparatus, such as a fire engine, connected to the outlet 8 and having a demand greater than can be furnished through the meter 5, will cause a lowering of pressure on the outlet side of the valve which would create the excess of pressure on the inlet side sufficient to open the valve.

What I claim and desire to secure by Letters Patent of the United States is:—

1. In a check valve, a casing having a valve seat, a valve coöperating with the valve seat, a gravity member movable independently of the valve and adapted to hold the valve in closed position, a support, means whereby the opening movement of the valve moves said gravity member upon said support where it is held independently of the valve and out of holding relation to the latter, and means whereby the valve on closing moves the gravity member from said support.

2. In a check valve, a casing having a valve seat, a valve coöperating with the valve seat, a gravity member movable independently of the valve to hold the valve in closed position, a support, means whereby the opening movement of the valve moves said gravity member out of holding relation to the valve and onto said support, and means whereby the valve on closing positively moves the gravity member from said support.

3. In a check valve, a casing having a valve seat, a valve coöperating with the valve seat, a gravity member movable independently of the valve to hold the valve in closed position, a support, means whereby the opening movement of the valve moves said gravity member out of holding relation to the valve and onto said support, said means including a projection on the valve engaging said member, a sliding pivot for the member, and a cam on said support engaged by the member.

4. In a check valve, a casing having a valve seat, a valve coöperating with said valve seat, a gravity member movable independently of the valve to hold the valve in closed position, a pivot, a slot in said member receiving said pivot, and a connection between the valve and said gravity member whereby opening movement of said valve swings said gravity member on said pivot and slides it on said pivot to a position out of holding relation to the valve.

5. In a check valve, a casing having a valve seat, a valve coöperating with said valve seat, a gravity member movable independently of the valve to hold the valve in closed position, a pivot, a support, a slot in said member receiving said pivot, and a connection between the valve and said gravity member whereby opening movement of said valve swings said gravity member on said pivot and slides it on said pivot onto said support to a position out of holding relation to the valve.

6. In a check valve, a casing having a valve seat, a valve coöperating with said seat, a gravity member movable independently of the valve and operable to hold the valve in closed position, and means whereby opening movement of the valve moves said member out of holding relation to the valve, said means being constructed to permit the valve to move toward and away from its seat while said member is out of holding relation to said valve.

7. In a check valve, a casing having a valve seat, a valve coöperating with said seat, a gravity member movable independently of the valve and operable to hold the valve in closed position, means whereby opening movement of the valve moves said member out of holding relation to the valve, said means being constructed to permit the valve to move toward and away from its seat while said member is out of holding relation to said valve, said means consisting of a lost-motion connection between the valve and said member, and a support for said member upon which said member is moved when the valve opens.

8. In a check valve, a casing having a valve seat, a valve coöperating with said seat, a gravity member adapted to hold the valve in closed position, means whereby opening movement of the valve moves said member out of holding relation to the valve, means for retaining the gravity device in inoperative position while permitting a limited movement of the valve, and means whereby the valve on closing renders said retaining means inoperative.

9. In a check valve, a casing having a valve seat, a valve coöperating with said seat, a pivotally mounted gravity member operable to hold the valve in closed position, means whereby opening movement of the valve moves the gravity member out of holding relation to the valve, means independent of the valve for retaining the gravity member out of holding relation to the valve, and means actuated by the closing of the valve for positively disengaging the gravity member and said retaining means.

10. In a check valve, a casing having a valve seat, a valve coöperable with the valve seat, a pivoted gravity member having its pivotal movement independent of the valve, a support, and means for moving said gravity member onto said support to relieve the valve thereof when the valve opens.

11. In a check valve, a casing having a valve seat, a valve pivoted to move toward and away from said seat, a gravity member pivoted to swing relative to said valve and operable to hold the valve to its seat, and means for moving the gravity member out of holding relation to the valve.

12. In a check valve, a valve casing having a valve seat, a pivoted valve coöperable with said seat, a gravity member mounted for pivotal and sliding movement relative to the valve, and adapted to engage the valve to hold it in closed position, and means whereby opening movement of the valve swings said member on its pivot and slides it out of the path of movement of the valve.

13. In a check valve, a valve casing having a valve seat, a pivoted valve coöperable with said seat and having an upward curved projection, a gravity member mounted for pivotal and sliding movement relative to the valve and adapted to engage said projection to hold the valve in closed position, and means whereby opening movement of the valve swings said member on its pivot and slides it to carry it out of the path of movement of said projection on the valve.

14. In a check valve, a valve casing having a valve seat, a pivoted valve coöperating with the valve seat, and having an operating extension, a gravity member mounted for pivotal and sliding movement relative to the valve and adapted to hold the valve in closed position, said member being engaged by said operating extension to move it out of holding engagement with the valve and out of the path of movement of the latter.

15. In a check valve, a valve casing having a valve seat, a pivoted valve coöperating with the valve seat, and having an operating extension, a gravity member mounted for pivotal and sliding movement relative to the valve and adapted to hold the valve in closed position, said member being engaged by said operating extension to move it out of holding engagement with the valve and out of the path of movement of the latter, and a face on said member with which the said extension coöperates to hold the said member out of holding position.

16. In a check valve, in combination, a casing having a valve seat, a valve coöperating with said seat, a gravity member movable independently of the seat and operable to hold the valve in closed position, means whereby the opening movement of the valve moves said member out of holding relation to the valve, said means including a lost motion connection between the valve and said gravity member.

17. In a check valve, a casing having a valve seat, a valve coöperating with said seat and having a holding arm, a gravity member movable independently of the valve and adapted to engage the holding arm to hold the valve in closed position, means whereby opening movement of the valve moves said gravity member out of holding relation to the valve, said means including a lost motion connection between said valve and member and constructed upon closing movement of the valve to clear said member from said arm.

In testimony whereof I have hereunto signed my name in the presence of two subscribing witnesses.

LLEWELLYN T. BARNES.

Witnesses:
C. G. HEYLMUN,
PAUL H. FRANKE.